Figure 3:
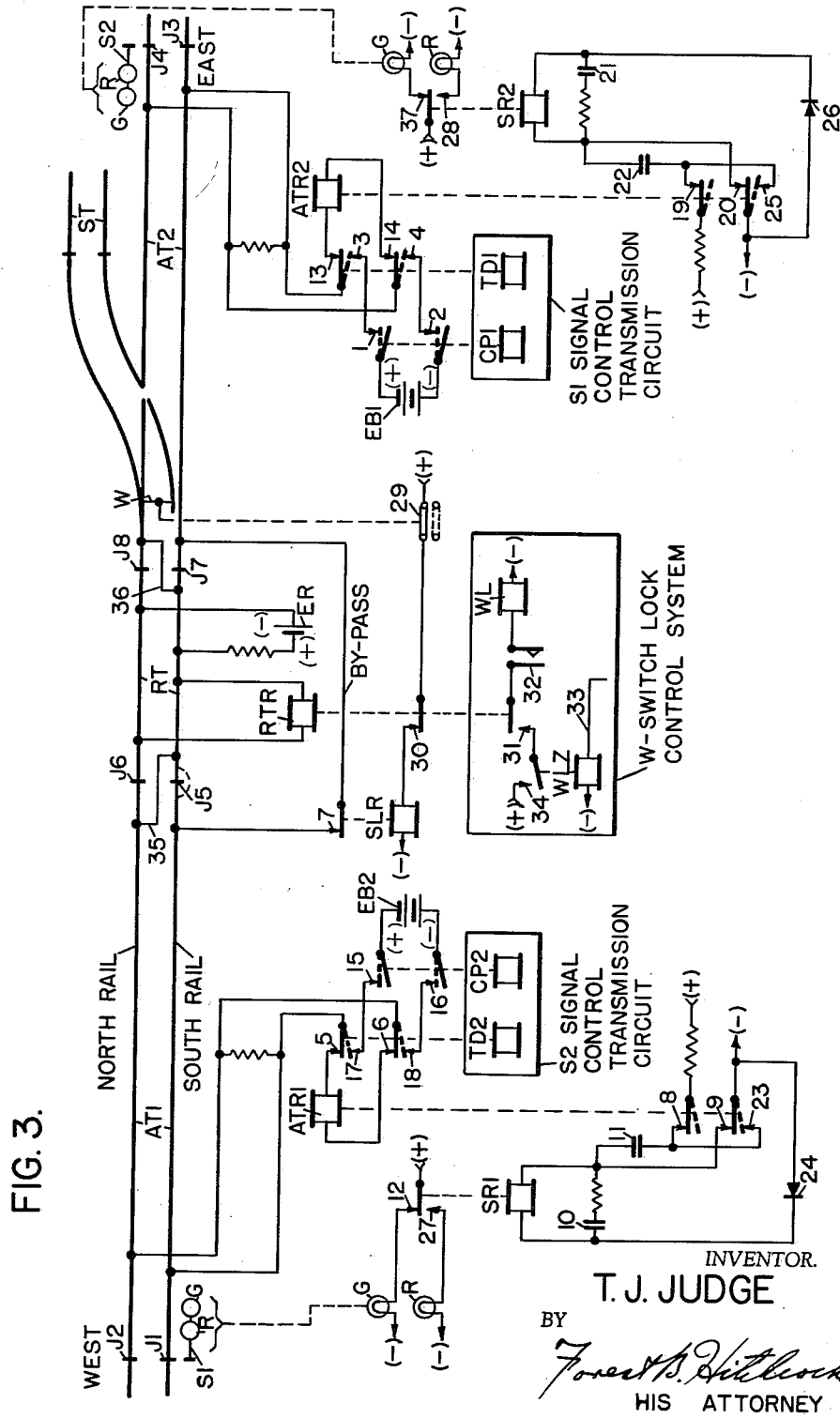

July 3, 1962 T. J. JUDGE 3,042,799
BROKEN DOWN JOINT PROTECTION FOR SWITCH
LOCK RELEASE TRACK CIRCUITS
Filed June 29, 1959 2 Sheets-Sheet 1
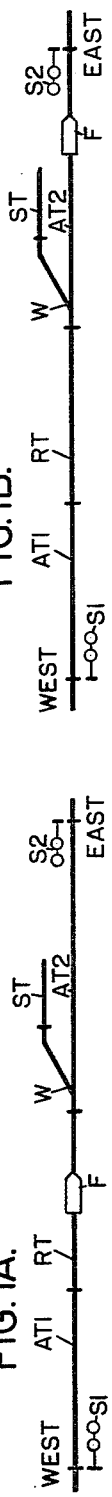
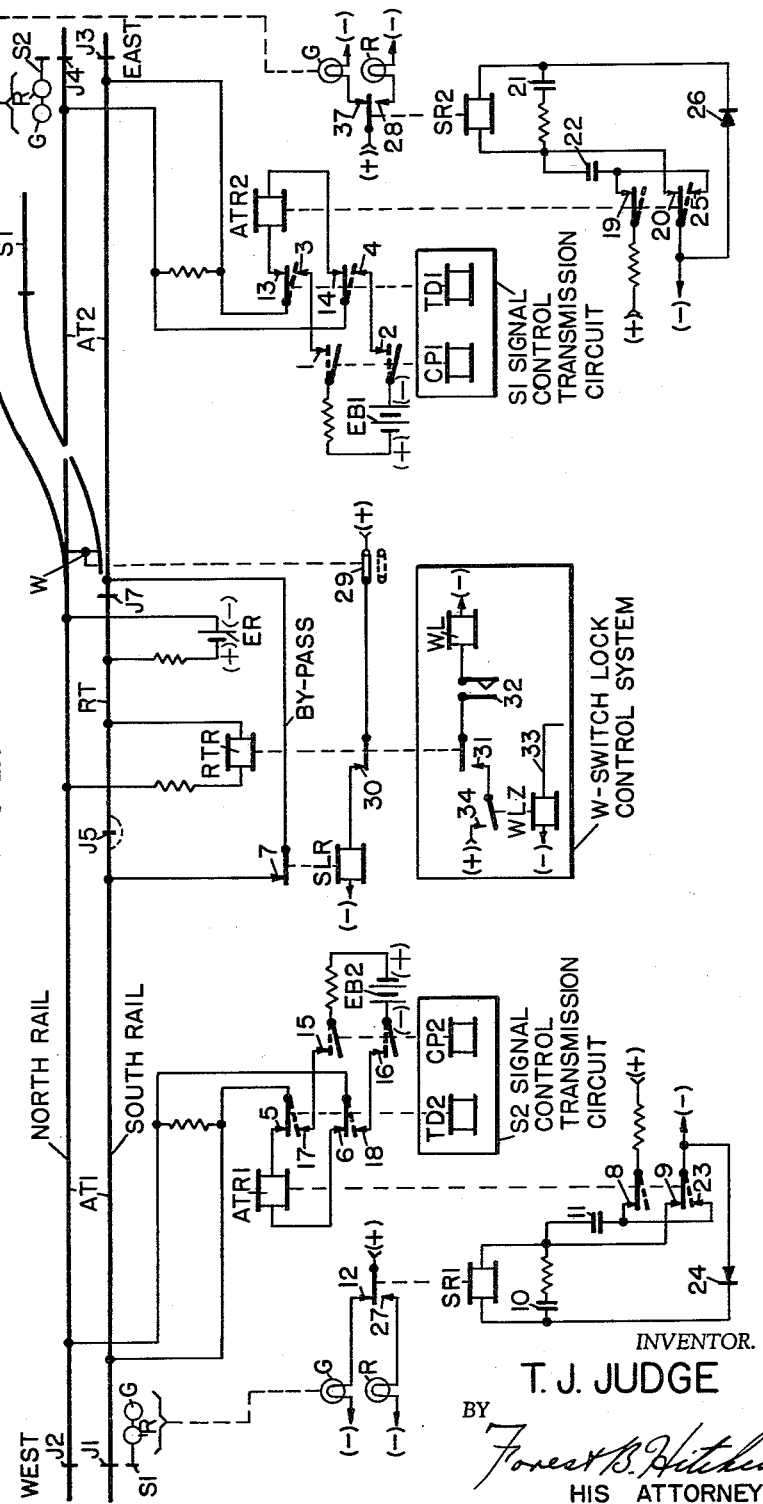
INVENTOR.
T. J. JUDGE
BY
Forest B. Hitchcock
HIS ATTORNEY INVENTOR.
T. J. JUDGE
BY Forest B. Hitchcock
HIS ATTORNEY

United States Patent Office 3,042,799
Patented July 3, 1962

3,042,799
BROKEN DOWN JOINT PROTECTION FOR SWITCH LOCK RELEASE TRACK CIRCUITS
Thomas J. Judge, Rochester, N.Y., assignor to General Railway Signal Company, Rochester, N.Y.
Filed June 29, 1959, Ser. No. 823,529
4 Claims. (Cl. 246—41)

This invention relates to the detection of the breakdown of insulated joints in railway track circuits, and more particularly, it relates to broken down joint detection and safe signal protection in conjunction with track circuits utilized where remote track switches are located along the main tracks of the railroad.

Many railroads operate switches at relatively remote locations along main tracks. Such switches are generally hand operated, and they can only be operated upon the concurrence of (1) the presence of a train on a specially provided release track section, (2) the opening of a switch lock door by a trainman, and (3) a permissive signal from a control office, the latter being notified by the trainman by means of a wayside telephone that the train is ready to proceed to the siding. The release track sections for these remote switches are often located within larger single block track sections of the overall block signaling system controlling the main track. Under the methods presently used to isolate the intermediate release track circuit from the overall track circuit for the entire block, a breakdown of the insulated joints separating the track sections may result in unsafe conditions due to clear signal failures caused by the overall track circuit being energized by the intermediate release track circuit as will be explained more fully below.

The present invention, by unique use of additional insulated joints and cross bonds between the track sections involved, obviates this unsafe possibility by assuring that the intermediate release track circuit will not energize the overall track circuit even in the event of a complete breakdown of the insulated joints in question. At the same time, the present invention permits immediate detection of any such breakdown of an insulated joint.

An object of the present invention, therefore, is to provide means for preventing unsafe signal failures caused by the breakdown of insulated joints separating intermediate release track sections from an overall block track circuit.

It is a further object of the present invention to provide means whereby, regardless of a complete breakdown in the insulated joints separating an intermediate release track circuit from an overall block track circuit, the overall block track circuit will not indicate an unoccupied condition.

Another object of this invention is to provide immediate detection of the breakdown of insulated joints separating an intermediate release track circuit from an overall block track circuit.

Another object of the present invention is to provide complete protection from and detection of the breakdown of insulated joints separating an intermediate release track circuit from an overall block track circuit without appreciably increasing the resistance of the overall block track circuit.

Other objects, purposes and characteristic features of the present invention will be in part obvious from the accompanying drawings, and will be pointed out as the invention progresses.

In describing the invention in detail, reference will be made to the accompanying drawings in which like reference characters will designate the corresponding parts throughout the several views, and in which, FIGS. 1A and 1B show two assumed positions of an eastbound train within a single block of main line track having a remote switch and siding intermediate between the opposite ends of the block;

FIG. 2 illustrates schematically and in block form the presently utilized release track and switch lock circuits as well as the overall block signaling track circuit for the portion of main line track illustrated in FIGS. 1A and 1B; and FIG. 3 shows the circuitry and track layout illustrated in FIG. 2 as modified by the present invention by the addition of extra insulated joints and cross bonds.

For the purpose of simplifying the illustration and facilitating in the explanation the various parts and circuits constituting the embodiment of the invention have been shown diagrammatically and certain elements have been left in block form, the drawings having been made more with the purpose of making it easy to understand the principles and mode of operation than with the idea of illustrating the specific construction and arrangement of parts that would be employed in practice. Thus, the various relays and their contacts are illustrated in a conventional manner, and symbols are used to indicate connections to the terminals of batteries, or other sources of electrical current, instead of showing all the wire connections to these terminals. The symbols (+) and (—) are employed to indicate the positive and negative terminals respectively of suitable batteries, or other sources of direct current; and the circuits with which the symbols are used, always have current flowing in the same direction.

Although the present invention is illustrated in the drawings as being applied to a main stretch of single track having signals controlled by self-coding control apparatus, it is to be understood that the invention can be readily applied to similar stretches of track although other signal control systems are used.

All of the figures show main track section AT divided into two track sections AT1 and AT2 which are separated by intermediate release track section RT. Switch W, when in its reverse position, permits traffic to pass from the main track on to siding ST. Eastbound traffic entering main track section AT is governed by signal S1, while westbound traffic entering main track section AT is governed by signal S2.

*Normal Operation of Presently Utilized Overall Block Track Circuit*

Referring now to FIG. 2, insulated joints J1, J2 and J3, J4, electrically isolate main track section AT from track sections to the west and east respectively, while insulated joints J5 and J7 electrically isolate intermediate release section RT from adjoining track sections AT1 and AT2.

The coded track circuit illustrated for controlling signals S1 and S2 is a simplification of the type of signaling system disclosed in T. J. Judge, Pat. No. 2,703,839, issued March 8, 1955, showing only as much of the system as is required for a full understanding of the invention disclosed herein.

In accordance with this type of signaling system and assuming that all illustrated track sections are clear, code pulse relay CP1 of the S1 signal control transmission circuit picks up closing front contacts 1 and 2, and time delay relay TD1 drops away momentarily closing back contacts 3 and 4. At this time, time delay relay TD2 of the S2 signal control transmission circuit is in its normally picked up position closing front contacts 5 and 6. This closes a circuit from track battery EB1 to track relay ATR1, this circuit being traced as follows: from the positive side of track battery EB1 through front contact 1 and back contact 3, through the south rail of track section AT2, through the by-pass and front contact 7, through the south rail of track section AT1, through front contact 5 and the windings of track relay ATR1, through front contact 6 and the north rails of track sections AT1, RT and AT2, and through back contact 4 and front contact 2 to the negative side of track battery EB1. The closing of this circuit causes track relay ATR1 to pick up, closing front contacts 8 and 9. The closing of these last named contacts permits capacitor 11 to charge from (+) through front contact 8 and front contact 9 to (−). Soon thereafter code pulse relay CP1 drops away opening the circuit just traced above, and then the cycle is reversed. Time delay relay TD1 returns to its normally picked-up position opening back contacts 3 and 4 and closing front contacts 13 and 14. Code pulse relay CP2 picks up closing front contacts 15 and 16, and the time delay relay TD2 drops away momentarily opening front contacts 5 and 6 and closing back contacts 17 and 18. This closes a circuit from track battery EB2 to track relay ATR2 as follows: from the positive side of track battery EB2 through front contact 15 and back contact 17, through the south rail of track section AT1, through front contact 7 and the by-pass, through the south rail of track section AT2 and front contact 13, through the windings of track relay ATR2 and front contact 14, through the north rails of track sections AT2, RT and AT1, and through back contact 18 and front contact 16 to the negative side of battery EB2. This causes track relay ATR2 to pick up closing front contacts 19 and 20 causing the charge of capacitor 22.

Now returning in the time sequence to the moment when CP1 drops away and removes energy from track relay ATR1. At this time track relay ATR1 drops away opening front contacts 8 and 9 and closing back contact 23. This permits capacitor 11 to discharge through back contact 23, rectifier 24 and the windings of signal relay SR1, thus causing signal relay SR1 to pick up. At the same time, capacitor 10 is recharged by the discharge from capacitor 11. The discharge of capacitor 11 through the windings of signal relay SR1 causes that relay to pick up closing front contact 12 completing the obvious circuit for the green light of signal S1. Before capacitor 10 has completely lost its charge, code pulse relay CP2 drops away and code pulse relay CP1 picks up and the cycle repeats itself causing track relay ATR1 to pick up once again. The control of signal relay SR2 is quite similar to SR1 being picked up by the discharge of capacitor 22 through back contact 25, rectifier 26 and the windings of SR2, and being retained by capacitor 21. The picking up of signal relay SR2 closes front contact 37 and completes the obvious circuit lighting the green lamp of signal S2.

Whenever a train appears on track sections AT1 or AT2, track batteries EB1 and EB2 are shunted through the wheels and axles of the train. This causes track relays ATR1 and ATR2 to remain dropped away, and the charges on capacitors 10 and 21 become completely dissipated, signal relays SR1 and SR2 dropping away and closing back contacts 27 and 28. This closes the obvious circuits for the red lamps of signals S1 and S2 showing the block to be occupied.

During this entire discussion, it has been assumed that switch W has been in its normal position and that switch point contact 29 has been closed. Also, it has been assumed that release track relay RTR has been maintained in its picked up position by the circuit leading from the positive side of release track battery ER through the south rail of track section RT, through the windings of release track relay RTR and the north rail of track section RT to the negative side of track battery ER. When release track relay RTR is in its picked up position, front contact 30 is closed, closing a circuit from (+), switch point contact 29, front contact 30 and the windings of switch lock relay SLR to (−). This circuit maintains switch lock relay SLR in its picked up position, closing front contact 7.

Whenever a train occupies release track section RT, release track battery ER is shunted through the wheels and axles of the train causing release track relay RTR to drop away. This opens front contact 30 causing switch lock relay SLR to drop away opening front contact 7. Thus, whenever release track section RT is occupied, the by-pass circuit is open at front contact 7, opening the track circuits for both track relays ATR1 and ATR2. This results in the lighting of the red lamps of signals of S1 and S2 as explained above.

Thus, it follows that the signals go to stop whenever a train occupies any of the sections of the overall block.

*Normal Operation of Release Track Switch Lock*

Switch W is controlled by a switch lock system such as that disclosed by G. J. Johanek, Patent No. 2,774,863, issued December 18, 1956. Again, the drawings attached hereto illustrate in simplified form only so much of the switch lock control system as is necessary to a full understanding of the invention disclosed herein.

The purpose of the switch lock system is to safe-guard railway traffic from the possibility of an unauthorized reversal of switch W. This protection is offered by the switch lock circuits which, preliminary to the operation of switch W require (1) that a train be present on release track RT, (2) that the door to the switch lock mechanism be opened by a trainman, and (3) that a permissive signal be received from a control office, the control office being notified by the trainman by means of a track telephone that the train standing on the release track is ready to proceed onto siding ST.

Assuming that train F has stopped on release track RT as shown in FIG. 1A, that the trainman has called the central office requesting permission to enter siding ST, and that a trainman has opened the door to the switch lock mechanism, the operation of the switch lock control circuits is as follows: release track battery ER is shunted by the wheels and axles of train F removing energy from release track relay RTR which drops away opening front contact 30 and closing back contact 31. The opening of the door to the switch lock mechanism closes door contact 32. The supervisor at the control office closes a switch energizing line 33 and causing remote switch lock control relay WLZ to pick up, closing front contact 34. This closes a circuit from (+), through front contact 34 and back contact 31, door contact 32 through the windings of switch lock release relay WL, to (−), causing switch lock release relay WL to pick up. This releases the dog locking switch W and permits the trainman to operate switch W to its reverse position.

After train F has proceeded onto siding ST a check is provided in the W switch lock control system so that switch W must be restored to its normal position and the door to the switch lock mechanism must be closed before the main line signals are cleared once again. Part of this check is provided by switch point contact 29 which is not closed until switch W is locked in its normal position. Thus, the by-pass is open at front contact 7 until switch lock relay SLR picks up following the clearing of release track section RT, permitting release track relay RTR to pick up and closing front contact 30, and the closing of switch point contact 29.

*Clear Signal Failure Due to Breakdown of Insulated Joint*

When the track circuits illustrated in FIG. 2 and explained above were originally installed, it was generally assumed that they were fail-safe since a breakdown of insulated joints J5 or J7 would cause track relays ATR1 or ATR2 to remain constantly energized by virtue of the circuit closed from release track battery ER through one or the other of the broken-down joints. Such a constant energization of track relay ATR1 or ATR2 would retain it in its picked up position allowing the charge on capacitor 10 or 21 to dissipate and preventing the discharge of capacitor 11 or 22. This would cause signal relay SR1 or SR2 to drop away, and its associated signal S1 or S2 would go to stop.

However, in actual practice insulated joints do not always break down at times when the track sections involved are unoccupied. Often, it is the action of the wheels of a passing train in conjunction with other factors that causes the breakdown, and it is precisely this condition that results in clear signal failures in the presently utilized track circuits illustrated in FIG. 2.

To illustrate this condition, it is assumed that insulated joint J5 has broken down during the passage of eastbound train F, and that train F has just left release track section RT and is presently on track section AT2 as shown in FIG. 1B. As train F leaves release track RT, release track battery ER ceases to be shunted by train F and a circuit is completed from the positive side of release track battery ER and the south rail of release track RT, through broken down joint J5 and the south rail of track section AT1, front contact 5 and the windings of track relay ATR1, through front contact 6 and the north rails of track sections AT1 and RT to the negative side of release track battery ER. It should be noted that both time delay relays TD1 and TD2 remain picked up when the track circuit is effectively shunted by a passing train. Thus, the closing of the last mentioned circuit causes track relay ATR1 to pick up. At the same time, release track relay RTR picks up closing front contact 30 and, a moment later, switch lock relay SLR picks up closing front contact 7 and closing the by-pass.

As soon as the by-pass becomes effective due to the closing of front contact 7, release track battery ER becomes effectively shunted by the circuit leading from the positive side of release track battery ER through the south rail of release track RT, broken down joint J5, front contact 7 and the by-pass to the south rail of track section AT2, through the wheels and axles of train F and the north rails of track sections AT2 and RT to the negative side of track battery ER. This causes both track relay ATR1 and release track relay RTR to drop away, the latter causing the opening of front contact 30 which in turn opens the circuit to the windings of switch lock relay SLR, causing it to drop away and opening front contact 7.

As soon as the by-pass is opened at front contact 7, release track battery ER is no longer shunted and it again causes the pick up of both track relay ATR1 and release track RTR. The picking up of release track relay RTR closes front contact 30, causing the pick up of switch lock relay SLR and closing front contact 7. This once again closes the by-pass circuit and release track battery ER is once again shunted through the broken down joint J5, front contact 7 and the by-pass, and the wheels and axles of train F.

Thus, under these conditions, as long as train F remains on track section AT2 track relay ATR1 intermittently picks up and drops away, making possible the energization of signal relay SR1 by virtue of the discharge paths of capacitors 10 and 11 as explained above. As the result of this, signal S1 shows a green clear signal even though track section AT2 is occupied—an obvious clear signal failure.

It should be readily apparent that a similar signal failure results in the event that a westbound train causes the breakdown of insulated joint J7.

*Fail-Safe Broken Down Joint Protection and Detection*

FIG. 3 represents the circuitry of FIG. 2 with the vital addition of the inventor's self-shunting means, namely, insulated joints J6 and J8 and cross bonds 35 and 36, which result in fail-safe protection and detection in the event of insulated joint breakdown.

Under normal operating conditions, the circuitry shown in FIG. 3 operates identical to the normal operation explained above in conjunction with FIG. 2 with the single exception that the overall track circuits described above connecting track batteries EB1 and EB2 with track relays ATR1 and ATR2 include the south rail of release track RT instead of the north rail of release track RT. For example, the track circuit connecting track batteries EB1 with track relay ATR1 is as follows: from the positive side of track battery EB1 through front contact 1 and back contact 3, the south rail of track section AT2, through the by-pass and front contact 7, the south rail of track section AT1, front contact 5, the windings of track relay ATR1, front contact 6 and the north rail of track section AT1, through cross bond 35, the south rail of release track RT and cross bond 36, through the north rail of track section AT2, back contact 4 and front contact 2 to the negative side of track battery EB1.

The condition of joint breakdown described above will now be assumed in view of the circuit changes shown in FIG. 3, assuming that eastbound train F has just caused the breakdown of insulated joint J5 and that train F has just left release track RT and is presently occupying track section AT2 as illustrated in FIG. 1B. Under these conditions, when release track battery ER is no longer shunted by train F it will *not* energize track relay ATR1, since the negative side of release track battery ER remains isolated from the AT1 track section circuit and no drop of potential is created across windings of track relay ATR1, cross bond 35 effectively connecting the positive side of release track battery ER to both sides of track relay ATR1. Thus, track relay ATR1 remains deenergized, as does signal relay SR1, signal S1 remaining red indicating stop.

This same protection is afforded in the event of the breakdown of insulated joint J7 following the passage of a westbound train, namely, release track battery ER will *not* energize track relay ATR2 due to the fact that the negative side of release track battery ER remains isolated from the AT2 track section circuit, and the positive side of release track battery ER being effectively connected to both sides of track relay ATR2, thus assuring that signal S2 continues to indicate stop.

In the event of breakdown of insulated joints J6 or J8, cross bonds 35 and 36 will shunt release track battery ER, again protecting against the unauthorized energization of track relays ATR1 or ATR2 by release track battery ER.

Once train F has left the overall track sections, the breakdown of insulated joints J5, J6, J7 or J8 is detected as follows:

(1) The breakdown of J5 causes the shunting of the AT1 track section circuit by the connection of the north and south rails of track section AT1 through broken down joint J5 and cross bond 35, and the shunting of the AT2 track section circuit by the connection of the north and south rails through the by-pass, front contact 7, broken down joint J5, the south rail of release track section RT and cross bond 36. The effect of this shunting is to remove energy from the windings of both track relays ATR1 and ATR2 which remain dropped away resulting in signals S1 and S2 going to stop as explained above.

(2) The breakdown of insulated joint J7 similarly causes the shunting of the AT1 and AT2 track section circuits. The north and south rails of track section AT2 are connected through broken down joint J7 and cross bond 36, while the north and south rails of track section AT1 are shunted through the by-pass and front contact 7, broken down joint J7, the south rail of release track section RT and cross bond 35. The shunting of these circuits similarly results in signals S1 and S2 going to stop.

(3) The breakdown of insulated joint J6 causes the shunting of the RT release track section circuit by the connection of the north and south rails of track section RT through cross bond 35 and broken down joint J6. This shunts release track relay RTR which drops away opening front contact 30 which in turn removes energy from switch lock relay SLR, causing front contact 7 to open. The opening of the by-pass by the opening of front contact 7 effects the opening of the overall AT1 and AT2 track circuits, resulting in the deenergization of track relays ATR1 and ATR2, and again causing signals S1 and S2 to indicate stop as explained above.

(4) The breakdown of insulated joint J8 also causes the shunting of release track RT by connecting the north and south rails of release track RT through cross bond 36 and broken down joint J8. This similarly results in the deenergization of release track relay RTR, the opening of front contact 30, the deenergization of switch lock relay SLR, the opening of front contact 7, and the resulting opening of the AT1 and AT2 track circuits. The opening of these circuits results in the deenergization of track relays ATR1 and ATR2, once again causing signals S1 and S2 to indicate stop.

Thus, the self-shunting means provided by the addition of insulated joints J6 and J8 and cross bonds 35 and 36, as shown in FIG. 3, provides full protection against the unwarranted energization of track relays ATR1 or ATR2 by release track battery ER, preventing the highly objectionable clear signal failure presently encountered in circuits of this type as explained above. At the same time, the self-shunting means disclosed herein provides immediate fail-safe detection of insulated joint breakdown by causing the control signals to indicate stop even though the track sections involved are unoccupied.

It should also be noted that the fail-safe results provided by this invention have been attained without appreciably affecting either the resistance or the length of the overall block track circuits involved.

Having described one specific embodiment of the present invention it is desired to be understood that this form has been selected to facilitate in the disclosure of the invention rather than to limit the number of forms which it may assume; and, it is to be further understood that various modifications, adaptations, and alterations may be applied to the specific form shown to meet the requirements of practice without in any manner departing from the spirit or scope of the present invention.

What I claim is:

1. In a block signaling system for railroads provided with a stretch of track comprising first and second running rails utilized as conductors for electrical track circuits controlling wayside signals and divided into an intermediate track section with an adjoining track section at each end thereof, insulated joints for electrically isolating the first and second running rails of said intermediate track section respectively from the first and second running rails of said adjoining track sections, by-pass circuit means for electrically connecting the respective second running rails of said adjoining track sections to each other, cross bonds at each end of said intermediate track section for electrically connecting the respective first running rails of said adjoining track sections with the second running rail of said intermediate track section, intermediate track circuit means utilizing said running rails of said intermediate track section for detecting the presence of a train on said intermediate track section, and overall track circuit means including an occupancy responsive means and utilizing the running rails of both said adjoining track sections and said second running rail of said intermediate track section for detecting the presence of a train on said adjoining track sections, whereby said intermediate track circuit is incapable of electrically actuating the occupancy responsive means of said adjoining track circuits upon the breaking down of any one of said insulated joints.

2. In a block signaling system for railroads having a stretch of track with at least one main insulated track section, an intermediate track section located within said main track section and having both rails thereof insulated from the rails of said main track section, circuit means for electrically connecting together the respective ends of one of the rails of said main track section adjacent said intermediate track section, and cross bonds for electrically connecting the respective ends of the other of the two rails of the main track section adjoining said intermediate track section to the opposite one of said two rails of said intermediate track section, whereby the rails of said main track section and said circuit means and said cross bonds and said opposite rail of said intermediate track section may be used for one track circuit and the rails of said intermediate track section may be used for a local track circuit with appropriate protection for said main track section in the event of breakdown of one or more of the insulated joints electrically separating said track sections.

3. In combination, a main track section having first and second parallel rails, a pair of spaced insulated joints disposed intermediate the ends of each of said first and second rails to form an intermediate track section, a main track circuit including a source of electrical energy connected across said first and second rails beyond opposite ends of said intermediate track section and a track occupancy responsive means connected across said first and second rails beyond opposite ends of said intermediate track section, an intermediate track circuit including a source of electrical energy and a track occupancy responsive means connected across said first and second rails in said intermediate track section, said track occupancy responsive means being operatively actuated by its respective energy source when its respective track section is unoccupied and said energy source being rendered ineffective to operatively actuate its respective ocupancy means when said first and second rails of its respective section are electrically shunted, a first means electrically connecting the first rail of the main track section at opposite ends of the intermediate track section to the second rail in the intermediate track section and a second means electrically connecting the second rail of the main track section at opposite ends of the intermediate track section to each other to form a continuous conductive path for said main track circuit, whereby said sources of energy for said main and intermediate track circuits are ineffective to operatively actuate electrically said track occupancy responsive means of the main track circuit upon the breaking down of any one of said insulated joints.

4. A combination as claimed in claim 3 wherein said main occupancy responsive means of the main track circuit is a relay, and includes means for alternately energizing and deenergizing said relay when the track circuit is unoccupied, and signal means operative to indicate a proceed indication only when said relay is being alternately energized and deenergized.

References Cited in the file of this patent

UNITED STATES PATENTS

| | | |
|---|---|---|
| 1,232,441 | Thurber | July 3, 1917 |
| 1,255,668 | Thurber | Feb. 5, 1918 |
| 2,113,983 | Gilson | Apr. 12, 1938 |
| 2,565,117 | Bettison | Aug. 21, 1951 |
| 2,747,080 | McGuire | May 22, 1956 |
| 2,881,308 | Quinlon | Apr. 7, 1959 |